United States Patent Office 3,329,653
Patented July 4, 1967

3,329,653
PREPARATION OF CONDENSATION POLYMERS IN THE PRESENCE OF A NON-SOLVENT AND A SWELLING AGENT
Ellington M. Beavers, Meadowbrook, and Marvin J. Hurwitz, Elkins Park, Pa., and Donald Mason Fenton, Anaheim, Calif., assignors to Rohm & Haas Company, Philadelphia, Pa., a corporation of Delaware
No Drawing. Filed Oct. 22, 1965, Ser. No. 502,511
8 Claims. (Cl. 260—47)

This invention relates to condensation polymers and to methods for their preparation in a non-solvent medium. This application is a continuation-in-part of copending application Ser. No. 141,308, filed Sept. 28, 1961, now abandoned.

Condensation polymers, such as polyamides, polyesters, polyureas, and the like, are very useful compositions of matter. They are extensively used in innumerable applications, the principal being as fibers, films, molded plastics, and coatings. Such polymers have been prepared in many different ways. For example, polyamides can be prepared by condensing a dicarboxylic acid and a diamine or a salt thereof in the molten state and under very low pressure, as described in Carothers' United States Patent Nos. 2,071,253, 2,130,523 and 2,130,948 (Melt Process). However, such a process has a number of limitations. For example, since the reaction temperature must be above the melting range of the starting materials, oligomers and products, the process is inapplicable to polymers which, because of insufficient heat stability, degrade at the reaction temperature. Another limitation is that polymerization is adversely affected because of the high viscosity of the melt. It has also been proposed in United States Patent 2,987,507 to conduct the condensation of a diamine salt of a dicarboxylic acid at below the melting point of the salt while it is suspended in a non-solvent medium, and in United States Patent 3,061,-592 to polymerize cyclic lactams while they are suspended in inert fluids in which lactams are insoluble. These processes as they have been described are difficult to control and do not readily yield the high molecular weight polymers obtainable by the process herein described.

Similar difficulties are encountered in the preparation of polyesters by condensation of a glycol with a dicarboxylic acid by conventional method as described in United States Patent No. 2,465,319 to Whinfield et al. An attempt to circumvent these difficulties by polymerizing the polymer in a solvent and then precipitating it therefrom has been proposed by Izard et al. in United States Patent No. 2,597,643 (Solution Process).

We have now found that linear condensation polymers of unusually high molecular weight can be readily formed at below the melting point of the polymer by carrying out the condensation reaction, or at least the latter stages of it, while the reacting materials are suspended in an inert non-solvent medium, provided that there is also present in the reaction medium a swelling agent for the condensation polymer. Products may be made by the invention which are ideally suited for use in the coating field, in fluidized bed techniques, for injection or extrusion molding applications, for sintering applicatons, as plastics, plasticizers, synthetic lubricants, films, and fibers, and in many other valuable applications.

A cardinal advantageous feature of the process of the invention is that the viscosity of the reaction mixture is only partially dependent and generally independent of the molecular weight of the polymer. Another advantage is that the system of the invention does not limit the concentration of polymers because of solubility problems, as in the solution process, or their molecular weight, as in the melt process or solution process. Accordingly, polymers of very high molecular weight are obtainable in accordance with this invention.

The condensation monomers which are useful starting materials in the present invention may be solids or liquids; they may be soluble or insoluble in the liquid continuous phase. Independently of the solubility characteristics of the starting materials as the reaction proceeds there are formed oligomers from these starting materials which are insoluble in the continuous phase. Thus, the oligomers form a non-continuous phase which continues to polymerize till the desired polymers are formed. In the process of the invention, the starting materials may be employed in stoichiometric amounts or one or several reactants may be used in excess, such as 1 to 50%. In the latter case, the excess is removed in the course of the reaction. As the polymerization proceeds, the removal of by-product is a measure of the progress of the reaction. The reaction may be considered terminated at different extents of polymerization depending on the type of polymer and the use intended for it. If superpolymers are desired, which are fiber-forming, polymerization is continued until the polymers are viscous enough to be drawable. Another measure of the extent of polymerization is the intrinsic viscosity. In general, it is desirable, if products of optimum quality are to be obtained, to prolong the heating beyond that point where the intrinsic viscosity has become 0.4. Those superpolymers having an intrinsic viscosity above 0.5 furnish materials of very high strength. Products having an intrinsic viscosity between 0.5 and 2.0 are especially useful. The extent to which it is desirable to carry the polymerization varies with the nature of the polymer.

In accordance with the invention, the condensation polymer is formed and continues condensing, as a non-continuous phase in a non-solvent liquid for the polymer. The liquids that may be used are non-solvent for the polymers at condensation temperatures and between condensation temperature and room temperature (20° to 35° C.). The non-solvent liquid best suited for a particular condensation reaction depends largely upon the particular reaction and the temperature at which it is carried out. For the production of polyamides and polyesters, aliphatic hydrocarbons are quite satisfactory. For the production of poly(hexamethylene carbamide), water is a satisfactory non-solvent. Satisfactory non-solvents may also be found among other classes of liquids such as the alicyclic and aromatic hydrocarbons, chlorinated hydrocarbons, and oxygen- or nitrogen-containing organic liquids such as ketones, ethers, nitriles, or nitro compounds. In general, it may be said that a satisfactory non-solvent should have a solubility parameter which differs by two or more from the solubiilty parameter of the polymer. As the difference increases over two, the insolubility of the two phases increases. Solubility parameters and other related values, such as cohesive energy density, are described in P. S. Small, J. Appl. Chem. 3, 71 (1953). The non-solvent should also have a boiling range that is broad enough to cover the reaction temperatures so that refluxing conditions are maintained. Adjustment of the boiling range of the non-solvent system can be achieved by adding, while the reaction proceeds, higher boiling fractions and/or withdrawing lower boiling fractions of the non-solvent system.

Typical non-solvents which are readily available include the following: mineral spirits—boiling point range 177° to 205° C.; ink oil—boiling point range 266° to 293° C.; mineral spirits boiling point range 275° to 352° C.; other aliphatic hydrocarbons of the following boiling point ranges: 218° to 238° C.; 209° to 230° C., and mixtures of aliphatic and aromatic hydrocarbons as one having a boiling point range of 240° to 267° C. Such liquids are commercially available under the following names: Shell Solvent 71, Soltrol 170, Ink Oil P-2, Aramco 450 Solvent, Esso Motor No. 28 and Inkol 0. For most purposes, the non-solvent medium is chosen from a group of liquids whose boiling range is from about 150° C. up to about 300° C.

The respective proportion of non-continuous phase and continuous phase non-solvent varies depending on the particular polymer prepared. However, for most purposes, it is sufficient if the concentration of the discontinuous phase is not more than 75% of the total reaction mixture. In many cases, a concentration of 25% to 65%, and even sometimes 5 to 25, has been found very satisfactory. Although the invention is not to be restricted or limited by any theoretical explanation submitted herein, it is believed that as solid, crystalline particles are being formed in the course of the reaction, the swelling agent may be found in the matrix of the solid particle and there it dissolves and reorients the reactive ends thus making them available for further condensation reaction. Also, the swelling agent seems to promote the solvation and re-precipitation of the amorphous areas of the particle where the majority of the reactive end groups preferentially occur, thus extending and creating new crystallinity. An ordering influence appears to occur which may control the molecular weight distribution to give a distribution which is inherently different from that of random distribution which is obtained when the polymers are made by conventional processes. Polymeric condensation products which have a new order of crystallinity are capable of being formed in the system of the invention. For most purposes, the swelling agent is used in an amount ranging from 5 to 20%, based on the weight of solid polymer. The useful swelling agents are liquids that have a solvent action on the polymer that is being formed. Preferably, the differential in solubility parameters between the polymer and the swelling agent is equal or less than 2.

For the preparation of aliphatic polyamides, particularly useful swelling agents are ethylene glycol and the alkyl phenols, particularly o-cresol, nonyl phenol and octyl phenol. A class of swelling agents specially useful in producing polyesters are the ethers of the following formula $$CH_3O(C_2H_4O)_nCH_3$$

wherein $n$ is 2 to 4, i.e. tetraglyme (where $n=4$), triglyme (where $n=3$) and diglyme (where $n=2$). For the preparation of aromatic polyesters such as is obtained from diphenylol propane and isophthalic acid particularly effective swelling agents are tetramethylene sulfone, diphenyl ether, and quinoline.

The present invention is very valuable in preparing polymers containing recurring amide-type linkages. The polyamides are prepared in accordance with this invention by reacting together a primary or secondary diamine (i.e., a diamine having at least one hydrogen attached to each nitrogen) and either a dicarboxylic acid or an ester or anhydride thereof. Generally, the acid or its dialkyl or diaryl ester is employed. The salt of the dibasic acid and the diamine may also be used. The diamines suitable are the diprimary amines, primary secondary amines, or disecondary amines. When the greater reactivity is desired, the diprimary amines are generally the most satisfactory, and for the formation of superpolyamides capable of being drawn into fibers, aliphatic amines are generally best suited. By aliphatic diamine there is meant a diamine in which the nitrogen atoms are attached to aliphatic carbons, i.e., carbon atoms which are not part of an aromatic ring. Mixtures of diamines of any of the mentioned operable types may also be used. Superpolyamides may also be prepared from one or more diamines and (a) mixtures of dicarboxylic acids, (b) mixtures of amide-forming derivatives of different dibasic carboxylic acids, and (c) mixtures of dicarboxylic acids and/or amide-forming derivatives of dibasic carboxylic acids with one or more monoaminomonocarboxylic acids or amide-forming derivatives thereof.

Examples of dicarboxylic acids and diamines which may be used in the preparation of polyamides are the following: dicarboxylic acids: maleic, fumaric, oxalic, succinic, adipic, sebacic, $\alpha,\alpha'$-dimethyl adipic, $\alpha$-methyl glutaric, dimethylmalonic, diglycolic, $\beta$-oxydipropionic, glutaric, pimelic, suberic, azelaic, tetradecanedioic, p-phenylene diacetic, hexahydroterephthalic, phthalic, isophthalic, terephthalic and the like; diamines: tetramethylenediamine, pentamethylenediamine, hexamethylenediamine, $\alpha$ - methylhexamethylenediamine, decamethylenediamine, p - xylylenediamine, 1,4 - cyclohexanediamine, ethylenediamine, orthophenylenediamine, metaphenylenediamine, para - phenylenediamine, menthanediamine, piperazine, N,N' - dimethylhexamethylenediamine, 1,4-di(aminomethyl)cyclohexane, $\beta,\beta'$ - diaminodiethyl ether, $\gamma,\gamma$-diaminodipropyl ether , $\beta,\beta'$-diaminodiethylsulphide, $\gamma,\gamma'$-diaminopropylsulphide, 4,4'-bis(amino cyclohexyl)-methane, 4,4' - bis(aminophenyl)methane and the like. Typical polyamides are the following: polypentamethylene adipamide, polyhexamethylene adipamide, polyoctamethylene adipamide, polydecamethylene adipamide, polyhexamethylene suberamide and polyhexamethylene sebacamide.

The process of the invention is of special interest in the preparation of polycarbamides. These are obtained by polymerizing a carbonic acid derivative such as urea or a dialkyl or diaryl carbonate with a primary or secondary aliphatic polyamine. Useful polyamines include those of the formula $$NH_2[(CH_2)_x-NH]_y-(CH_2)_x-NH_2$$

in which $y$ is any integer including zero, and $x$ is an integer of at least 2. If fiber forming properties are desired, aliphatic diprimary diamines are preferred. A special aspect of the preparation of polycarbamides is a process which comprises polymerizing urea with a non-tertiary aliphatic diamine as a discontinuous polymeric phase dispersed in a continuous phase which is a non-solvent for the polycarbamide which is being formed. The reaction with urea is carried out at a temperature sufficient to cause the evolution of ammonia, but below that at which destructive decomposition of the polycarbamide would result. At least towards the end of the reaction, it generally lies in the range of 160° to 270° C. Heating is continued until substantially no more ammonia is evolved and, if desired, a product with fiber forming properties is obtained. Advantageously, the urea and the diamine are reacted first in water in substantially equimolar proportions to effect oligomer formation with the evolution of a portion of the total ammonia and then in dispersion in triglyme as the non-solvent with a limited amount of the water as swelling agent.

Instead of the diamine itself, salts thereof with volatile weak acids, such as the carbonates, may be employed. A current of inert gas may be passed through the reaction mixture.

Another very valuable class of condensation polymers preparable in accordance with this invention are polyesters. These may be derived from a variety of dibasic acids or dialkyl esters thereof, and glycols. As typical acids or derivatives thereof, there may be mentioned oxalic, substituted dicarboxylic acids such as dimethyl malonic acid, unsaturated acids such as fumaric, cycloalkanedicarboxylic acids such as cyclohexane-1,4-dicarboxylic acid, aromatic dicarboxylic acids such as isophthalic acid, terephthalic acid, diphenic acid, naphthalene-1,3-dicarboxylic acid, naphthalene-1,4-dicarboxylic acid, naphthalene-1,5-dicarboxylic acid and biphenyl-4,4'-dicarboxylic acid, aliphatic-aromatic dicarboxylic acids such as p-xylylene-dicarboxylic acid and m-xylylene-dicarboxylic acid. Examples of aromatic dicarboxylic diesters which can be employed include those which may be generically called terephthalic acid bodies, such as ester forming derivatives as aliphatic or aromatic esters of terephthalic acid, for instance, low molecular alkyl esters such as methyl, ethyl, propyl, butyl, amyl, hexyl and heptyl terephthalates, and aryl esters such as those from phenol, cresols and other homologues. In practice it is preferred to use the methyl or ethyl terephthalates, since these are cheap and the most readily available. As glycols, there may be mentioned the following: ethylene glycol, trimethylene glycol, tetramethylene glycol, 2,2-dimethyl-1,3-propanediol, 2,2-diethyl-1,3-propanediol, xylylenyl glycol and 1,4-bis(hydroxylmethyl)cyclohexane.

Other condensation polymers to which this invention is applicable are the polyesters derived from hydroxy acids such as lactic acid, ω-hydroxydecanoic acid, ω-hydroxycaproic acid, etc., and prepared either directly from the hydroxy acids or from appropriate derivatives of the hydroxy acids. Other polymers include polyamides derived from amino acids such as ε-aminocaproic acid, 6-aminocaproic acid, 7-aminoheptoic acid, 10-aminoundecanoic acid and 12-aminododecanoic acid.

Another especially interesting class of condensation polymers preparable in accordance with this invention are the polyesters of a polyhydric phenol, such as a bis(monohydroxyaryl)alkane or sulfone and a suitable polyester-forming reactant such as a dicarboxylic acid. Of special interest are the polyesters of bis(monohydroxyaryl)alkanes, such as bis(4-hydroxyphenyl)-2,2-propane and isophthalic acid. These esters can be readily prepared by the process of this invention using as starting materials bis(4-hydroxyphenyl)propane diacetate and isophthatic acid.

The invention can provide polyethylene terephthalate having an order of crystallinity different from that of the corresponding conventional polymers. As measured by X-ray diffraction patterns, the relative amounts of crystalline diffraction and amorphous scattering patterns of the polyethylene terephthalate of the invention is distinctly different from the pattern of the corresponding conventional polymer. The polyethylene terephthalate of the invention has a degree of crystallinity of at least 70%, whereas the corresponding conventional polymer has a ratio of crystallinity and amorphous content approaching 1:1 ratio with a slight edge for the crystalline area. Moreover, the polyethylene terephthalate of the invention has a melting point range of 270° to 290° C. which is significantly higher than that of the corresponding conventional polymer.

The invention is further illustrated by the following examples. These, however, are not intended to limit its scope. All parts are by weight.

*Example 1.—Poly(ethylene terephthalate)*

(a) A charge of 186 parts of ethylene glycol, 388 parts of dimethyl terephthalate, 400 parts of mineral spirits, 100 parts of the dimethyl ether of tetraethylene glycol, and 0.1 part of litharge are heated, with mechanical stirring, under nitrogen, in a 2-liter, 3-necked flask equipped with a nitrogen inlet tube, a thermometer, a mechanical stirrer and a steam-heated reflux condenser on which a Dear-Stark trap and a water-cooled condenser are attached. As the temperature approaches 140-150° C. the dimethyl terephthalate dissolves and a colorless solution is formed while methanol is distilled off. The collection of methanol is continued over a 1½ hour period during which the reaction temperature is raised to 180° C. and the mineral spirits begins to reflux in the steam condenser. After about 95% of the methanol is distilled off, the steam condenser is removed and replaced with a Dean-Stark tube assembly and gradually the excess ethylene glycol co-distills with the mineral spirits, the latter being allowed to return to the reaction mixture. As the removal of ethylene glycol progresses, the reaction mixture becomes more opaque and gradually a more viscous material appears which forms a fine white powder dispersed in the continuous non-solvent medium. Heating is continued for two more hours until 95% of the excess ethylene glycol is removed. A higher boiling aliphatic solvent (boiling range 266-293° C.) is then added to the reaction mixture, and an equal portion of mineral spirits is distilled off. The temperature of the refluxing mixture is gradually raised over a two-hour period to 240° C. During this time, the last traces of ethylene glycol continue to distill and the suspended solid particles become slightly enlarged. The temperature is maintained at 240° C. for 24 hours at which time heating is discontinued. Stirring is stopped and the batch is cooled to room temperature. The white powder of solid particles is filtered from the liquid non-solvent phase. The product is heated in a drying oven to give a white powder having a melting point of 286-290° C. It is insoluble in common organic solvents. The X-ray powder diffraction diagram shows that the white powder is highly crystalline and has an intrinsic viscosity in o-chlorophenol at 30° of 0.51. It is drawn into hard, tough fibers.

(b) Part (a) is repeated substituting the mineral spirits and the higher boiling aliphatic solvent by chlorinated naphtha.

*Example 2.—Poly(tetramethylene terephthalate)*

The procedure of Example 1 is followed with the substitution of 270 parts of tetramethylene glycol for ethylene glycol. Methanol is first distilled off and then excess tetramethylene glycol. The replacement of odorless mineral spirits with the higher boiling aliphatic solvent is allowed to proceed until a reflux temperature of 220° C. is reached. After an additional 24 hours reflux at 220 C. the powdered product is isolated by filtration, washed with hexane and dried.

*Example 3.—Poly(hexamethylene adipamide), from dimethyl adipate*

A charge of 128 parts (1.1 moles) of 1,6-hexanediamine, 174 parts of dimethyl adipate, 200 parts of mineral hydrocarbon ink oil, 100 parts of mineral spirits, 60 parts of the dimethyl ether of tetraethylene glycol and 2 parts of phenyl sulfide are heated, with mechanical stirring under dry nitrogen in a 1-liter, 3-necked flask equipped with a nitrogen inlet tube, a thermometer, a mechanical stirrer and a steam-heated condenser to which were attached a Dean-Stark trap and a water cooled condenser. As the temperature approaches 160° C., methanol begins to distill off. At this point, the reaction mixture is a clear yellowish liquid. As the reaction progresses, the reaction mixture becomes opaque and after one-half hour, when the weight of the distillate approaches 70% of the theoretical, a fine, white powder is formed which becomes dispersed in the continuous non-solvent medium. As the reaction temperature is increased over a four-hour period to 220° C. the remainder of the theoretical amount of methanol is removed. Excess 1,6-hexanediamine co-distills with the non-solvent liquid medium. Heating is continued for 16 hours at 240 to 245° C.; heating and stirring are discontinued and the reaction mixture is cooled. A white powder is filtered from the aliphatic hydrocarbon and dried. The melting point range of the powder is 255-260° C. The powder is insoluble in common organic solvents and can be drawn into tough pieces, cast into clear tough films, used as the molding powder or as a fluidized bed powder. The intrinsic viscosity in formic acid at 30° is 0.95.

*Example 4.—Poly(hexamethylene adipamide), from adipic acid*

A charge consisting of 585 g. (5.04 moles) of hexamethylene diamine, 730.5 g. of adipic acid (5.0 moles), 1250 ml. of Soltrol 170 non-solvent (aliphatic hydrocarbon blend from Phillips Petroleum, boiling range 225-232° C.), 375 g. of o-cresol swelling agent and 1.25 g. of sodium hypophosphite stabilizer is heated with mechanical stirring under dry nitrogen. As the temperature approaches 165-175° C. water begins to distill. The lower polyamide layer becomes progressively more viscous and finally peptizes when vigorous agitation is applied. The temperature continues to rise as o-cresol swelling agent is distilled off. The batch is held at reflux for 21 hours then cooled. The powdered polyamide is isolated by filtration, washed with acetone and dried in a rotary evaporator at 140–150° C. and <1 mm. of Hg for three hours. The resulting polyamide has an [$\eta$] of 3.24–3.60 in 90% formic acid and a melting range of 266–275° C.

*Example 5.—Poly(hexamethylene adipamide-co-caprolactam) 50/50 mole ratio*

A charge consisting of 73 g. of adipic acid (0.5 mole), 58.5 g. of hexamethylene diamine (0.5 mole), and 56.5 g. of caprolactam (0.5 mole), was heated slowly in a dispersion system consisting of 350 ml. of OMT (odorless mineral thinner) non-solvent and 50 ml. of n-butyl Cellosolve swelling agent (0.25 g. sodium hypophosphite added as stabilizer). Over a two hour period the reaction temperature is allowed to rise slowly to about ~180° C. during which time water of condensation and n-butyl Cellosolve swelling agent distill off. The reaction mixture passes through a two phase system with the lower polymer layer becoming progressively more viscous and finally becoming stiff so that vigorous stirring is needed to convert the polyamide layer into a fine powder. The powdered dispersion is heated further so that at two hours after powdering a steady reflux temperature of 188° C. is obtained. The polyamide is isolated by filtration, washed with acetone and dried at 150° C. and <1 mm. Hg vacuum for three hours, yield essentially quantitative, [$\eta$]=0.55 in 90% formic acid, M.P. of fiber 211° C.

*Example 6.—Poly(nonamethylene adipamide)-nylon 96*

A charge consisting of 79.9 g. of nonomethylene diamine (0.505 mole) and 73.1 g. of adipic acid (0.50 mole) is dispersed in 300 ml. of OMT non-solvent to which has been added 37.5 g. of o-cresol swelling agent. Over a two hour heat up period during which time water of condensation and o-cresol are distilled off the temperature rises to about 185° C. and the condensing polyamide lower phase becomes progressively more viscous and finally breaks up into a powder under vigorous agitation. The product is isolated by filtration three hours after powdering, washed with acetone, then dried at 150° C. in a vacuum oven, yield quantitative, [$\eta$]=1.68 in 90% formic acid.

*Example 7.—Poly(2,2-bis-4-hydroxyphenylpropane isophthalate)*

To 780.9 g. (2.5 moles) of the diacetate of 2,2-(p,p'-dihydroxydiphenyl) propane is added 415.3 g. (2.5 moles) of isophthalic acid, 900 g. of Apco Inkol No. 0 (boiling range 255–265° C.), 25 g. of tetramethylene sulfone (Sulfolane) swelling agent and 2.5 g. of sodium methoxide catalyst. The mixture is heated with stirring under a dry nitrogen atmosphere. As the temperature approaches 245° C. acetic acid begins to distill. As the acidolysis progresses phase separation occurs. The lower polyester layer becomes progressively more viscous and with stepped up agitation is easily broken up into a fine powder. The reaction is held at reflux for about 40 hours. The dispersion is cooled and the polymer is isolated by filtration, washed with hexane and dried at 160–170° C. and <1 mm. Hg for 8–12 hours. The resultant powdered polyester has an [$\eta$] of 0.91 in 60/40 phenol-sym-tetrachloroethane and a softening range of about 310–320° C.

*Example 8.—Poly 4,4'-dihydroxydiphenylsulfone isophthalate*

The procedure of Example 7 is followed with the substitution of 835.8 g. (2.5 moles) of the diacetate of 4,4'-dihydroxydiphenylsulfone for the diacetate of 2,2-(p,p'-dihydroxydiphenyl) propane. The corresponding poly(sulfone isophthalate) is thereby obtained.

*Example 9.—Block poly(ester-amide)*

A poly(ethylene terephthalate) with hydroxyl termination and a poly(hexamethylene adipamide) with methyl ester termination were prepared by the methods similar to those described in Examples 1 and 3 respectively. 154.4 parts of the methyl ester terminated polyamide (theoretical molecular weight 5146) and 151.6 parts of the hydroxyl terminated polyethylene terephthalate (theoretical molecular weight 5054), 300 parts of mineral spirits, 60 parts of the dimethyl ether of tetraethylene glycol and 0.05 part of litharge is heated with stirring under nitrogen. As the temperature approaches 210° C., methanol begins to distill off. The reflux temperature of the reaction mixture is increased to 235° C. by carrying out a solvent exchange substituting a portion of the mineral spirits by an equivalent proportion of ink oil. The reflux temperature is maintained at 235° C. to 240° C. for 19 hours. The reaction mixture has a suspension of fine solid particles in the non-solvent. At the end of the reaction, stirring and heating are discontinued and the batch is allowed to cool to about 50° C. A white particled solid is collected by filtration; it is washed with acetone and dried in a vacuum oven at 120° C. for 5 mm. of mercury pressure for 48 hours. The poly(ester-amide), poly(hexamethylene adipamide-ethylene terephthalate) is a white powder, cold-drawable into tough fibers which can also be cast into clear, tough films. The melting point range of this block polymer is 240–245° C. The powder is insoluble in common organic solvents.

*Example 10.—Poly(hexamethylene carbamide)*

A charge consisting of 60 g. of urea (1.0 mole), 116 g. of hexamethylene diamine (1.0 mole) and 150 g. of water is heated slowly. The extent of condensation is followed by titration of by-product ammonia which is given off. Low condensed 6D1 polymer is formed during the aqueous condensation stage, i.e., about 50% of the theoretical ammonia evolution has occurred when the reflux temperature has reached 111° C. To this solution is added 150 g. of Triglyme, i.e., the dimethylether of triethylene glycol whereupon a hazy dispersion results. Water is allowed to distill off as the temperature is raised. The polyamide separates as a fine powder. At the end of a seven hour heating and water distillation period the final reaction temperature 214° C. is close to that of triglyme. The powdered polymer is isolated by filtration, washed with water, then acetone and dried. Cold drawable fibers can be obtained from the melt, M.P. 290–297° C.

We claim:

1. In a process for the preparation of a condensation polymer of the class consisting of polyesters and polyamides, including polycarbamides, wherein an oligomeric condensation product is heated and a low molecular weight by-product is volatilized from the system in order to promote the formation of a higher molecular weight polymer, the improvement which comprises heating the oligomeric condensation product as a dispersed, discontinuous phase at reflux temperature in a liquid non-solvent for the condensation polymer that boils within the range of 150° C. to 300° C. which non-solvent forms the continuous phase and in the presence of a swelling agent for said condensation polymer, separating the low molecular weight by-product from the system and replacing the non-solvent as needed whereby the conversion of oligomeric condensation products to higher molecular weight condensation products is accomplished while they are dispersed as a discontinuous phase in a liquid non-solvent continuous phase.

2. A process as claimed in claim 1 wherein the condensation reaction is continued until there is formed a condensation polymer that can be drawn into a continuous filament.

3. A process as claimed in claim 1 wherein the highest temperature to which the reaction mass is subjected is below the melting point of the condensation polymer.

4. A process as claimed in claim 3 wherein the condensation polymer is at least in part a poly(hexamethylene-adipamide).

5. A process as claimed in claim 3 wherein the condensation polymer is poly(ethylene terephthalate).

6. A process as claimed in claim 3 wherein the condensation polymer is poly 2,2-bis-4-hydroxyphenylpropane isophthalate.

7. A process as claimed in claim 3 wherein the condensation polymer is poly(hexamethylene carbamide).

8. A process as claimed in claim 1 wherein the solubility parameter of the non-solvent differs by at least two from the solubility parameter of the polymer and wherein the solubility parameter of the swelling agent differs by less than two from the solubility parameter of the polymer.

References Cited

UNITED STATES PATENTS

| | | | |
|---|---|---|---|
| 2,831,834 | 4/1958 | Magat | 260—78 |
| 2,847,397 | 8/1958 | Kleine et al. | 260—75 |
| 2,865,895 | 12/1958 | Pieper et al. | 260—78 |
| 2,978,438 | 4/1961 | Indest et al. | 260—78 |
| 2,987,507 | 6/1961 | Levine | 260—78 |
| 3,006,898 | 10/1961 | Walter | 260—77.5 |
| 3,037,001 | 5/1962 | Becke et al. | 260—78 |
| 3,061,592 | 10/1962 | Schnell et al. | 260—78 |
| 3,160,602 | 12/1964 | Kantor et al. | 260—47 |

OTHER REFERENCES

Tobolsky: Properties and Structure of Polymers, John Wiley and Sons, New York, 1960, pp. 64 and 66.

WILLIAM H. SHORT, *Primary Examiner.*

H. D. ANDERSON, *Assistant Examiner.*